(12) United States Patent
Sato et al.

(10) Patent No.: US 11,571,847 B2
(45) Date of Patent: Feb. 7, 2023

(54) HOLLOW ARTICLE MOLDING METHOD AND MOLDING APPARATUS AND HOLLOW ARTICLE

(71) Applicant: NISSEI ASB MACHINE CO., LTD., Nagano (JP)

(72) Inventors: Soichiro Sato, Nagano (JP); Masayuki Usami, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 230 days.

(21) Appl. No.: 16/633,850

(22) PCT Filed: Jul. 27, 2018

(86) PCT No.: PCT/JP2018/028244
§ 371 (c)(1),
(2) Date: Jan. 24, 2020

(87) PCT Pub. No.: WO2019/022231
PCT Pub. Date: Jan. 31, 2019

(65) Prior Publication Data
US 2020/0238594 A1    Jul. 30, 2020

(30) Foreign Application Priority Data
Jul. 27, 2017  (JP) .............................. JP2017-145872

(51) Int. Cl.
*B29C 49/70*    (2006.01)
*B29C 49/06*    (2006.01)

(52) U.S. Cl.
CPC .............. *B29C 49/70* (2013.01); *B29C 49/06* (2013.01); *B29C 2049/701* (2013.01)

(58) Field of Classification Search
CPC ..... B65D 1/0246; B29C 49/062; B29C 49/06; B29C 49/70; B29C 45/44;
(Continued)

(56) References Cited

U.S. PATENT DOCUMENTS

| 2,026,304 A | 12/1935 | Deady |
| 6,068,811 A | 5/2000 | Koda |
| 6,102,225 A | 8/2000 | Lynn |

(Continued)

FOREIGN PATENT DOCUMENTS

| CN | 2897847 Y | 5/2007 |
| CN | 201961710 U | 9/2011 |

(Continued)

OTHER PUBLICATIONS

Office Action issued in corresponding Chinese Patent Application No. 201880050306.4 dated Apr. 2, 2021, along with English Translation thereof.

(Continued)

*Primary Examiner* — Monica A Huson
(74) *Attorney, Agent, or Firm* — Greenblum & Bernstein, P.L.C.

(57) ABSTRACT

A hollow article is molded in a state where an inner surface of a neck portion including an inner screw portion is held by an inner neck mold, and then, the hollow article is demolded from the inner neck mold by inserting an ejection rod into the hollow article to be engaged with an inner surface of the hollow article and rotating the hollow article together with the ejection rod.

10 Claims, 11 Drawing Sheets

(58) Field of Classification Search
CPC ........ B29C 2049/701; B29C 2049/704; B29C 2049/4892; B29C 2049/4887; B29C 2049/4889; B29C 2049/543; B29C 2049/545; B29C 49/76; B29C 2049/705; B29B 11/14; B29B 11/08; B29B 2911/1404; B29B 2911/14033; B29B 2911/14335; B29B 2911/14426; B29B 2911/14393; B29B 2911/14453; B29B 2911/14026; B29B 2911/1402; B29L 2001/00; B29L 2031/716
See application file for complete search history.

(56) References Cited

U.S. PATENT DOCUMENTS

2008/0017642 A1* 1/2008 King .................. B65D 51/1688
220/285
2016/0001486 A1 1/2016 Lefebure et al.

FOREIGN PATENT DOCUMENTS

| DE | 1860495 U | 10/1962 |
| EP | 1298376 | 4/2003 |
| JP | 62-156923 | 7/1987 |
| JP | 5-35057 | 5/1993 |
| JP | 10-76566 | 3/1998 |
| JP | 11-79208 A | 3/1999 |
| JP | 2003-97780 | 4/2003 |
| WO | 2005/028186 | 3/2005 |

OTHER PUBLICATIONS

Official Communication (ISR —ISA/210) issued in International Patent Application No. PCT/JP2018/028244, dated Sep. 4, 2018, along with an English translation thereof.
Official Communication (Writen Opinion —ISA 237) issued in International Application No. PCT/JP2018/028244, dated Sep. 4, 2018.
Extended European Search Report issued in the corresponding European Patent Application No. 18838611.4 dated Jun. 8, 2021.
Office Action issued in Corresponding Japanese Patent Application No. 2019-532882, dated Apr. 19, 2022, along with an English translation thereof.

* cited by examiner (a)

(b)

A-A'

(a)

(b)

HOLLOW ARTICLE MOLDING METHOD AND MOLDING APPARATUS AND HOLLOW ARTICLE

TECHNICAL FIELD

The present invention relates to a method for molding a hollow article having a screw portion (inner screw portion) on an inner surface (inner side) of a neck portion thereof, an apparatus for molding the hollow article, and the hollow article.

BACKGROUND ART

Conventionally, for example, many containers containing beverages or the like have a screw portion (outer screw portion) on an outer surface (outer side) of a neck portion thereof, and are closed by a cap mounted on the outer side of the neck portion having the outer screw portion. Further, there are not only containers which include the outer screw portion, but also containers which include a screw portion (inner screw portion) on an inner surface (inner side) of a neck portion and are closed by a cap mounted in the neck portion.

In addition to containers, some of various hollow articles having a space inside have an inner screw portion formed on an inner side of a neck portion thereof. Since the inner screw portion is a so-called undercut, it may be difficult to demold the neck portion from a mold that forms the inner screw portion when molding the hollow article including the inner screw portion.

A hollow article such as a container is formed by, for example, forming a preform by injection molding and then blow molding the preform. In this case, the inner screw portion of the neck portion is formed when injection molding the preform. Although the neck portion may be demolded after the injection molding of the preform (before the blow molding) from a mold by which the inner screw portion is formed, the neck portion may be demolded after the hollow article is formed by the blow molding from the mold by which the inner screw portion is formed (see, for example, Patent Literature 1).

The invention disclosed in Patent Literature 1 employs a neck mold having an inner and outer double structure including an outer neck mold that forms an outer surface of a neck portion and an inner neck mold that forms an inner surface of the neck portion including an inner screw portion. When injection molding the preform, the neck portion including the inner screw portion is formed, and the preform is blow molded in a state where the inner surface of the neck portion is held by the inner neck mold to form a container that is a hollow article. Thereafter, a roller is abutted against a body portion of the container to rotate the container, that is, the container itself is rotated, thereby demolding the neck portion from the inner neck mold.

By adopting such a method to demold the neck portion from an inner core mold, the hollow article such as the container can be successfully demolded from the inner neck mold while preventing deformation of the inner screw portion.

CITATION LIST

Patent Literature

Patent Literature 1: JP-B2-H05-35057

SUMMARY OF INVENTION

Technical Problem

However, when the hollow article is rotated by the method described above, if rigidity of the hollow article against which the roller abuts is low, the hollow article may be deformed, and the neck portion may not be appropriately demolded from the inner neck mold due to the deformation.

The present invention has been made in view of the above circumstances, and an object thereof is to provide a method for molding a hollow article, an apparatus for molding a hollow article, and a hollow article in which, when molding the hollow article including an inner screw portion, the hollow article can be successfully demolded from a neck mold that forms the inner screw portion.

Solution to Problem

According to an aspect of the present invention for solving the above problem, there is provided a method for molding a hollow article, the hollow article including a neck portion opened on one end side thereof and a body portion connected to the neck portion, and an inner screw portion being formed on an inner surface of the neck portion, the method including: molding the hollow article in a state where the inner surface of the neck portion including the inner screw portion is held by an inner neck mold, and then; demolding the hollow article from the inner neck mold by inserting an ejection rod into the hollow article to be engaged with an inner surface of the hollow article and rotating the hollow article together with the ejection rod.

Here, in a case where the hollow article includes a small-diameter portion having an inner diameter smaller than that of the neck portion and connected to the neck portion and the body portion, it is preferable that an opening shape of the small-diameter portion is formed in a non-circular shape, and the ejection rod is engaged with the hollow article by inserting the ejection rod having a cross-sectional shape substantially the same as the opening shape of the small-diameter portion into the small-diameter portion.

It is preferable that the opening shape of the small-diameter portion is formed in a polygonal shape or a circular shape having a convex portion that protrudes inwardly.

It is preferable that, when the hollow article is rotated by the ejection rod, a tip end surface of the ejection rod is caused to abut against the hollow article to press the hollow article.

According to another aspect of the present invention, there is provided an apparatus for molding a hollow article, the hollow article including a neck portion opened on one end side thereof and a body portion connected to the neck portion, and an inner screw portion being formed on an inner surface of the neck portion, the apparatus including: a molding part configured to mold the hollow article in a state where the inner surface of the neck portion including the inner screw portion is held by an inner neck mold; and a take-out part configured to demold the hollow article from the inner neck mold, in which the take-out part includes an ejection rod including an engagement portion rotatably inserted into the hollow article and engaged with an inner surface of the hollow article during rotation.

Here, it is preferable that the engagement portion is configured to engage with the inner surface of the hollow article when the ejection rod is rotated to one side.

It is preferable that the ejection rod includes an ejection piece whose tip end surface abuts against the hollow article and which is movable in an axial direction of the ejection rod, and a biasing member which biases the ejection piece to a tip end side of the ejection rod.

It is preferable that the ejection piece includes the engagement portion.

According to another aspect of the present invention, there is provided a hollow article including: a neck portion opened on one end side thereof and to which an inner screw portion is formed on an inner surface thereof; a body portion connected to the neck portion; and a small-diameter portion having an inner diameter smaller than that of the neck portion and connected to the neck portion and the body portion, in which an opening shape of the small-diameter portion is a non-circular shape.

More specifically, it is preferable that the opening shape of the neck portion is a polygonal shape or a circular shape having a convex portion that protrudes inwardly.

Advantageous Effects of Invention

According to the present invention, when molding the hollow article including the neck portion on which the inner screw portion is formed, the hollow article can be successfully demolded from the mold. In particular, the neck portion of the hollow article can be successfully demolded from the inner neck mold that forms the inner surface of the neck portion including the inner screw portion.

DESCRIPTION OF EMBODIMENTS

Hereinafter, embodiments of the present invention will be described in detail with reference to the drawings.

The present invention relates to a method for molding a hollow article having a screw portion (inner screw portion) on an inner surface (inner side) of a neck portion thereof, an apparatus for molding the hollow article, and the hollow article. Here, the hollow article refers to an article having a space therein, and includes, for example, a container that stores beverages or the like, a cap that closes the container, and a preform for blow molding the container. The hollow article in the present embodiment is, for example, a container for storing a liquid or the like.

Figure 1:
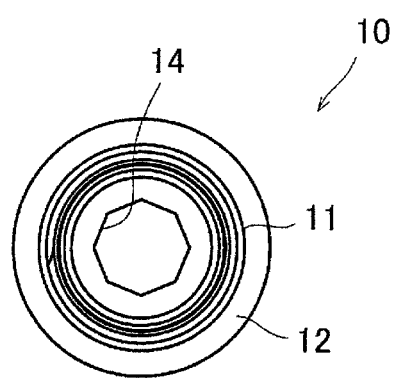
FIG. 1 is a view showing an example of a container that is a hollow article according to an embodiment of the present invention.
Figure 1:
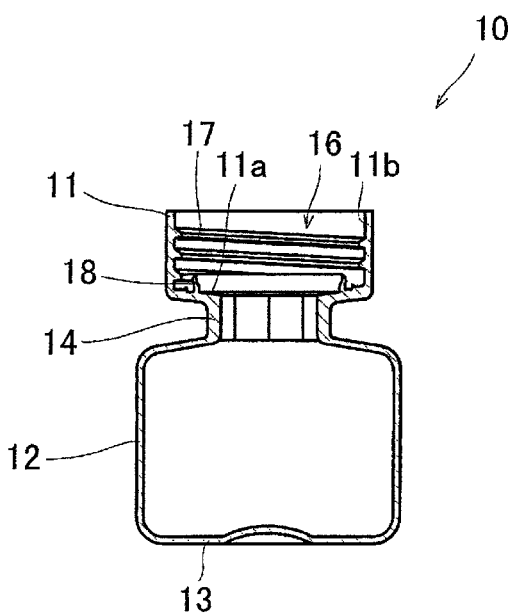
Figure 2:
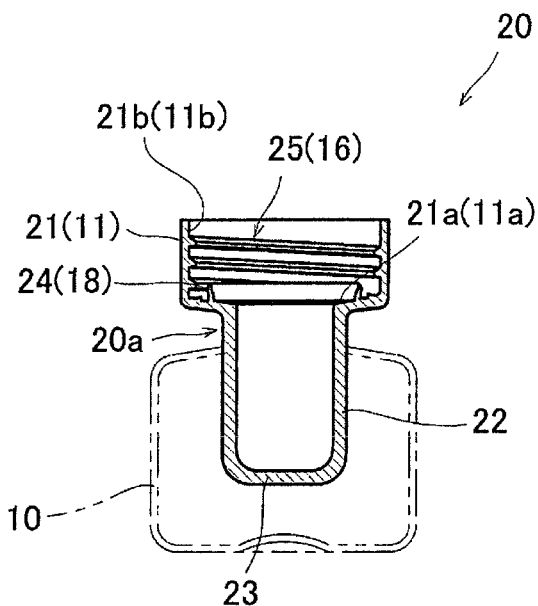
FIG. 2 is a view showing a preform for blow molding the container according to the embodiment of the present invention.

FIG. 1 is a view showing an example of a container that is a hollow article according to the present invention, in which (a) is a top view, and (b) is a longitudinal cross-sectional view. FIG. 2 is a longitudinal cross-sectional view of a preform for blow molding the container.

A container 10, which is the hollow article shown in FIG. 1, is formed of, for example, a resin material such as polypropylene, polyethylene, or polyethylene terephthalate, and is hollow so as to be able to store a liquid or the like. The container 10 includes a cylindrical neck portion 11 opened on one end side (upper end side) thereof, a cylindrical body portion 12 connected to the neck portion 11, and a bottom portion 13 continuous from the body portion 12. Further, the container 10 includes a small-diameter portion 14 connected to a bottom surface (reduced-diameter portion that extends in an inner diameter direction) 11a of the neck portion 11 and having an inner diameter smaller than that of the neck portion 11. The body portion 12 is formed with an inner diameter larger than that of the small diameter portion 14, and in the present embodiment, is formed with an inner diameter larger than that of the neck portion 11. A size of the inner diameter of the body portion 12 is not particularly limited, and the body portion 12 may be formed with an inner diameter smaller than that of the neck portion 11.

An inner screw portion 16, which is a female screw, is formed on an inner surface 11b of the neck portion 11. That is, on the inner surface 11b of the neck portion 11, a screw thread (projection) 17 that constitutes the inner screw portion 16 is provided in a spiral shape protruding toward an inner side of the neck portion 11. Although not shown in the drawings, the neck portion 11 is mounted with a mounting member including an outer screw portion that is a male screw, so that the container 10 is closed.

A protruding portion 18 is formed on the bottom surface 11a of the neck portion 11. The protruding portion 18 protrudes from the bottom surface 11a of the neck portion 11 toward an opening side (upward in the drawing), and is continuously provided along a circumferential direction of the neck portion 11.

When the mounting member (not shown) is mounted to the neck portion 11, the protruding portion 18 abuts against the mounting member and functions as a seal material that closes a gap between the protruding portion 18 and the container 10. Further, the protruding portion 18 is provided to protrude from the bottom surface 11a of the neck portion 11 in a curved shape (for example, a waveform) instead of a linear shape. A shape of the protruding portion 18 is not particularly limited, and may be any shape that can exert a function as the seal material.

Here, the small-diameter portion 14 of the container 10 has an outer diameter smaller than that of the neck portion 11, and an opening shape of the small-diameter portion 14 (cross-sectional shape of the inner diameter of the small-diameter portion 14) is a non-circular shape (a shape other than a circle), for example, a polygonal shape. In the present embodiment, the opening shape of the small-diameter portion 14 is octagonal.

As will be described below, the container 10 having such a shape is formed by first forming a preform by injection molding and blow molding the preform. In this case, by forming the small-diameter portion 14 into the above-described opening shape, the container 10 can be successfully demolded from a mold when the container 10 is molded.

As shown in FIG. 2, a preform 20 for blow-molding the container 10 includes a neck portion 21 opened at one end (upper end) side thereof, a body portion 22 that is continuous with the neck portion 21, and a bottom portion 23 that is continuous with the body portion 22.

The neck portion 21 of the preform 20 is a portion common to the neck portion 11 of the container 10 that is a final product, and has the same shape. That is, the neck portion 11 of the container 10 is substantially formed by injection molding. In the present embodiment, a protruding portion 24 (18) is formed on a bottom surface 21a (11a) of the neck portion 21 (11) of the preform 20, and an inner screw portion 25 (16) is formed on an inner surface 21b (11b) thereof.

The small-diameter portion 14 of the container 10 is also substantially formed by injection molding. That is, a connection portion 20a between the body portion 22 and the neck portion 21, which is a portion corresponding to the small-diameter portion 14 in the preform 20, is formed in a shape same as that of the small-diameter portion 14, and in the present embodiment, the opening shape is octagonal.

Figure 3:
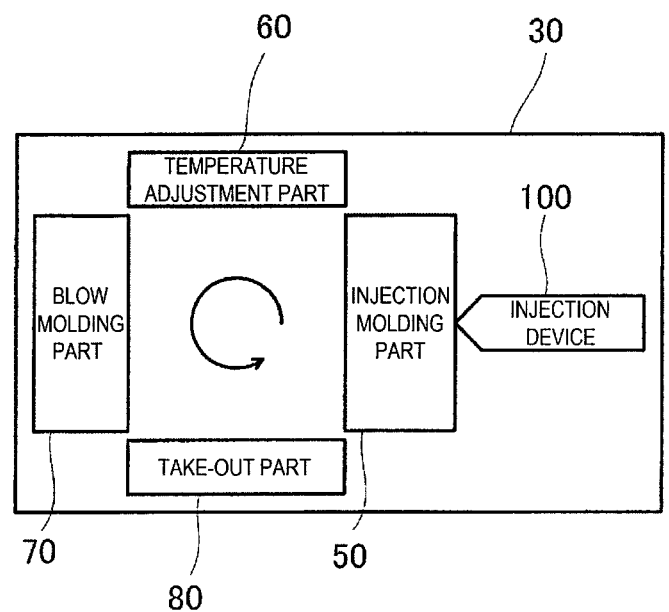
FIG. 3 is a block diagram showing an example of an injection blow molding apparatus according to the embodiment of the present invention.
Figure 4:
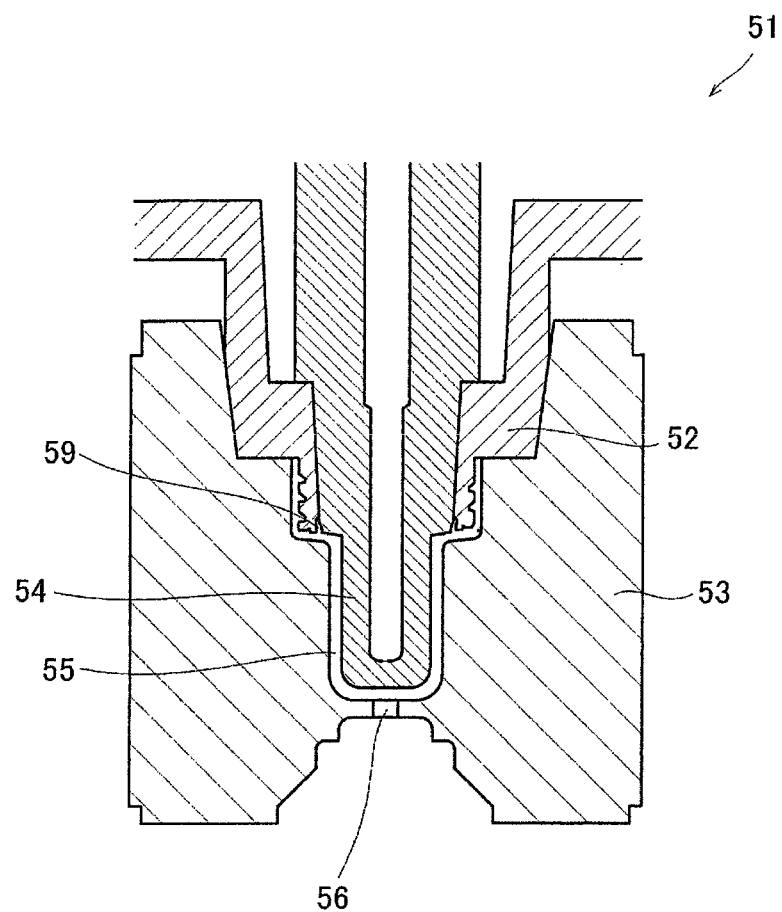
FIG. 4 is a cross-sectional view showing an example of an injection molding mold according to the embodiment of the present invention.
Figure 5:
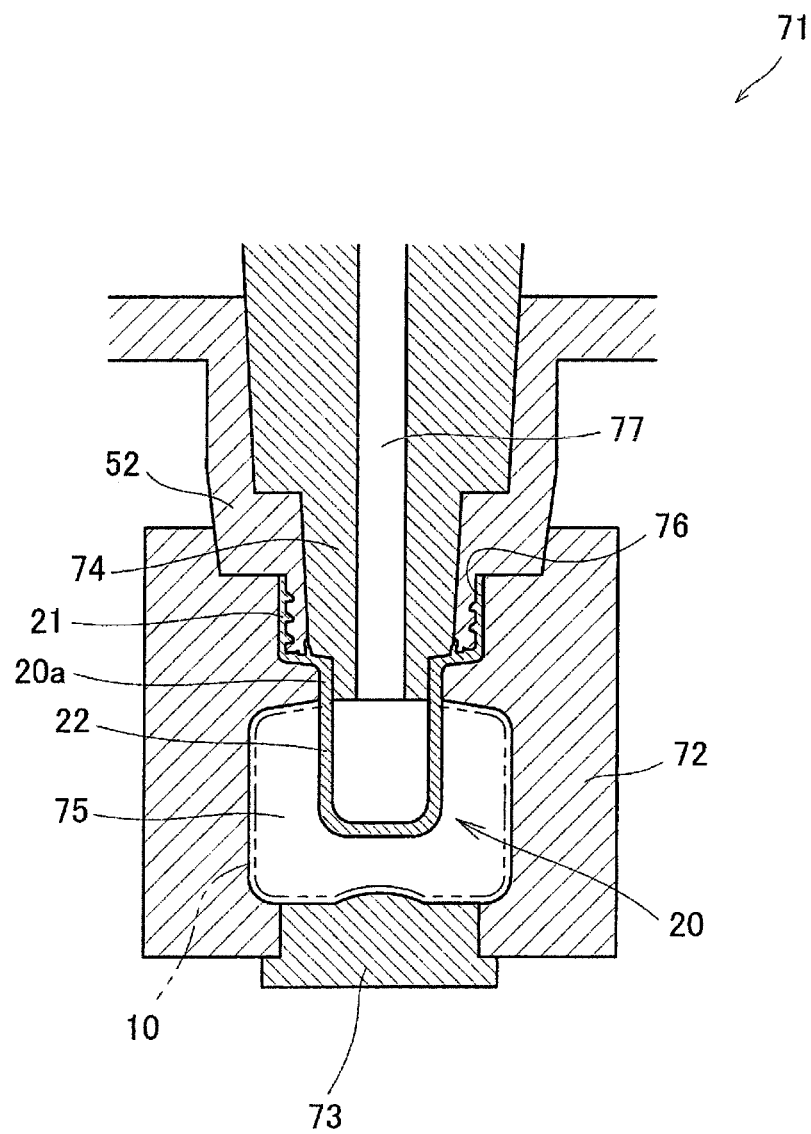
FIG. 5 is a cross-sectional view showing an example of a blow molding mold according to the embodiment of the present invention.

Next, an injection blow molding apparatus that is a molding apparatus for molding the container 10 that is the hollow article will be described. FIG. 3 is a block diagram showing an example of a schematic configuration of the injection blow molding apparatus according to the present embodiment. FIG. 4 is a cross-sectional view showing a schematic configuration of an injection molding mold. FIG. 5 is a cross-sectional view showing a schematic configuration of a blow molding mold.

As shown in FIG. 3, an injection blow molding apparatus 30 according to the present embodiment is a so-called one-stage (hot parison system) injection blow molding apparatus, and includes, an injection molding part 50, a temperature adjustment part 60, a blow molding part 70, and an take-out part 80.

As shown in FIG. 4, the injection molding part 50 includes an injection molding mold 51 to which an injection device 100 is connected, and injection molds the preform 20 having the predetermined shape by using the injection molding mold 51.

The injection molding mold 51 includes a neck mold 52, an injection cavity mold 53, and an injection core mold 54. An injection space 55 is formed by the neck mold 52, the injection cavity mold 53, and the injection core mold 54. The preform 20 having the predetermined shape is formed in the injection space 55 by filling a resin material as a raw material via a gate 56 provided at a center of a bottom portion of the injection cavity mold 53. Since the configuration for injecting the resin material including the injection device 100 is an existing configuration, a detailed description thereof will be omitted here.

The neck mold 52 according to the present embodiment is configured as an inner neck mold that forms an inner surface of the neck portion 21 of the preform 20. Specifically, the neck mold 52 forms a part (outer peripheral portion) of the inner surface 21b and the bottom surface 21a of the neck portion 21 including the inner screw portion 25 (see FIG. 2).

The injection cavity mold 53 forms outer surfaces of the body portion 22 and the bottom portion 23 of the preform 20. Further, the injection cavity mold 53 surrounds outside of the neck mold 52, and forms an outer surface of the neck portion 21. That is, the injection cavity mold 53 forms the outer surface of the neck portion 21 together with the outer surfaces of the body portion 22 and the bottom portion 23 of the preform 20.

The injection core mold 54 forms an inner surface of the preform 20. Specifically, the injection core mold 54 is disposed on an inner side of the neck mold 52, and forms a part (central portion: inner peripheral portion) of the bottom surface 21a of the neck portion 21 together with an inner surface of the body portion 22 of the preform 20. Further, a space portion 59, which constitutes a part of the injection space 55 and forms the protruding portion 24, is formed at a boundary portion between the injection core mold 54 and the neck mold 52.

Here, as described above, the opening shape of the small-diameter portion 14 of the container 10 is octagonal, and an opening shape of the connection portion 20a of the preform 20 corresponding to the small-diameter portion 14 is also octagonal. In the present embodiment, an opening shape of the body portion 22 of the preform 20 is circular.

In the injection molding portion 50, the preform 20 is injection molded using the injection molding mold 51. Thereafter, the injection cavity mold 53 and the injection core mold 54 are separated from the preform 20. That is, the preform 20 is demolded from the injection cavity mold 53 and the injection core mold 54. Then, the neck portion 21 of the preform 20 is in a state of being held by the neck mold 52. In this state, the preform 20 is conveyed from the injection molding part 50 to the temperature adjustment part 60.

In the temperature adjustment part 60, a temperature of the body portion 22 of the preform 20 is adjusted to a predetermined temperature suitable for blow molding. The preform 20 adjusted to the predetermined temperature is conveyed from the temperature adjustment part 60 to the blow molding part 70 in a state where the preform 20 is also held by the neck mold 52 here.

The blow molding part 70 includes, for example, a blow molding mold 71 shown in FIG. 5. The blow molding mold 71 is a mold for blow molding the preform 20 held by the neck mold 52 common to the injection molding mold 51, and includes a blow cavity mold 72, a bottom mold 73, and a blow core mold 74.

The blow cavity mold 72 includes a pair of split molds, and has a blow cavity 75 that is a space in which the body portion 22 of the preform 20 is stored. The bottom mold 73 forms a bottom portion of the blow cavity 75. That is, the bottom mold 73 is provided corresponding to the bottom portion 23 of the preform 20, and forms the bottom portion 13 of the container 10.

The blow cavity mold 72 according to the present embodiment includes a concave portion 76 in which the neck portion 21 of the preform 20 is stored, and the outer surface of the neck portion 21 stored in the concave portion 76 is supported by the blow cavity mold 72. That is, the blow cavity mold 72 surrounds outside of the neck portion 21. In a state where the neck mold 52 is positioned to abut against the blow cavity mold 72, the outer surface of the neck portion 21 is supported by the blow cavity mold 72.

In the state where the neck mold 52 is positioned to abut against the blow cavity mold 72, a minute gap may be formed between the outer surface of the neck portion 21 of the preform 20 and the blow cavity mold 72.

The blow core mold 74 includes a supply hole 77 for supplying blow air into the preform 20, and is disposed on an inner side the neck mold 52. The blow core mold 74 is inserted into the neck portion 21 of the preform 20, whereby the neck portion 21 is closed by the neck mold 52 and the blow core mold 74. In the present embodiment, the blow core mold 74 is inserted into the neck portion 21 and the connection portion 20a of the preform 20.

Although not shown in the drawings, a supply path through which a temperature adjustment medium or a cooling medium is supplied is formed in the blow cavity mold 72 including the pair of split molds. When stretched and brought into contact with an inner wall surface of the blow cavity mold 72, the preform 20 disposed in the blow cavity 75 is adjusted (for example, cooled) to a predetermined temperature.

In the blow molding part 70, high pressure air (blow air) is supplied to inside of the preform 20 disposed in the blow molding mold 71 via the supply hole 77 of the blow core mold 74, whereby the body portion 22 of the preform 20 is extended in a vertical axis direction and a horizontal axis direction. Accordingly, the body portion 12 of the container 10 is formed. That is, the container 10 having a predetermined shape that is a final product is molded (see FIG. 1). If necessary, a stretching rod (not shown) may be inserted into the supply hole 77 of the blow core mold 74 and driven in the vertical axis direction.

In the blow molding part 70, the blow-molded container 10 is then demolded from the blow cavity mold 72 and the blow core mold 74. Next, in a state where the inner surface of the neck portion 11 of the container 10 is held by the neck mold 52, the container 10 is conveyed from the blow molding part 70 to the take-out part 80.

Figure 6:
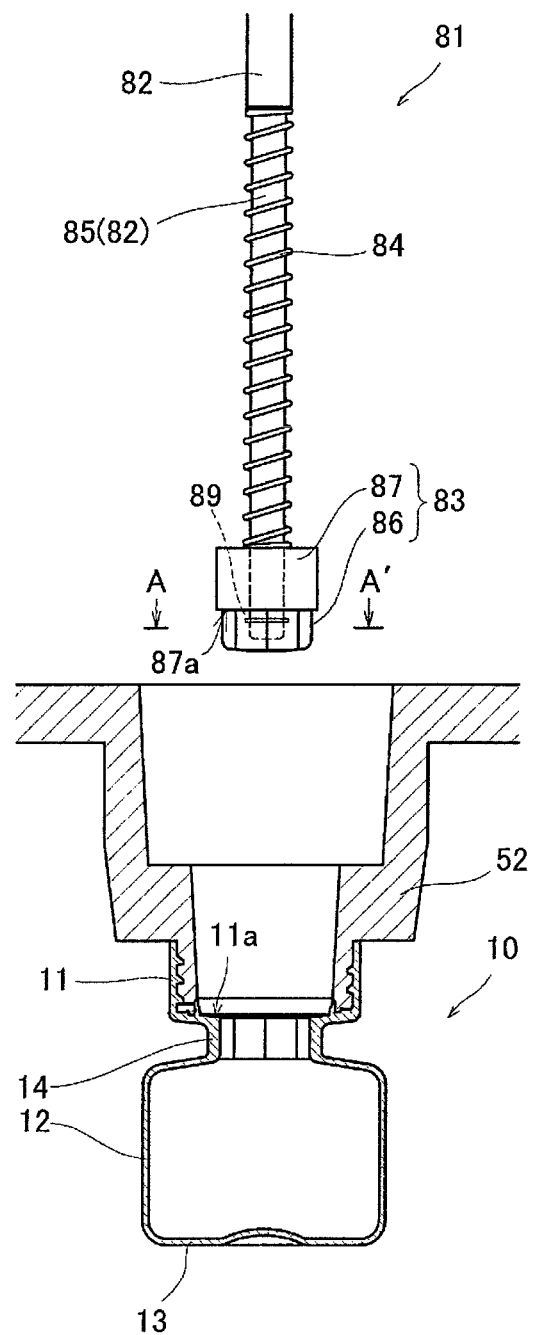
FIG. 6 is a schematic view showing the configuration of an ejection rod according to the embodiment of the present invention.

In the take-out part 80, the container 10, which is the hollow article, is demolded from the neck mold 52 and is taken out to outside of the injection blow molding apparatus 30. Specifically, as shown in FIG. 6, the take-out part 80 includes an ejection rod 81. Although not shown in the drawings, the ejection rod 81 can be lifted and lowered by a lifting device, and is configured to be lowered from above the neck mold 52 and inserted into the container 10.

In the present embodiment, the ejection rod 81 includes a rod-shaped rod member 82, and includes an ejection piece 83 mounted on the rod member 82, and a biasing member 84. A mounting portion 85 having a diameter smaller than those of other portions is formed on a tip end side of the rod member 82. The ejection piece 83 and the biasing member 84 are mounted on the mounting portion 85.

The ejection piece 83 includes an engagement portion 86 that engages with an inner surface of the container 10, and an abutment portion 87 that abuts against the bottom surface 11a of the neck portion 11. The engagement portion 86 has a cross-sectional shape (for example, an octagon) substantially the same as the opening shape of the small-diameter portion 14 of the container 10 to an extent that the engagement portion 86 is loosely fitted in the small-diameter portion 14. The abutment portion 87 has a diameter larger than an outer diameter of the small-diameter portion 14, and a tip end surface 87a of the abutment portion 87 abuts against the bottom surface 11a of the neck portion 11. In a case where a large force is required when the container 10 is demolded or the like, the engagement portion 86 may have a size that enables the engagement portion 86 to abut against (engage with) the small-diameter portion 14.

Figure 7:
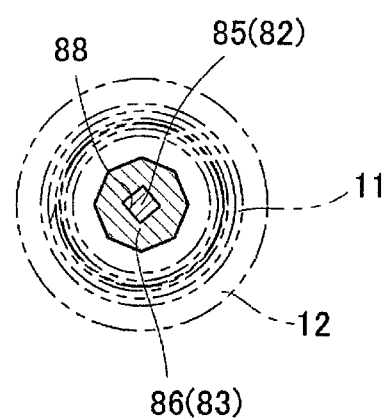
FIG. 7 is a cross-sectional view of the ejection rod according to the embodiment of the present invention, and is a cross-sectional view corresponding to a line A-A' in FIG. 6.

The ejection piece 83 is mounted movably in an axial direction without rotating with respect to the rod member 82. In the present embodiment, as shown in FIG. 7, a cross-sectional shape of the mounting portion 85 of the rod member 82 is polygonal (for example, quadrangular). In the ejection piece 83, a through hole 88 into which the mounting portion 85 is inserted is formed in a polygonal (for example, quadrangular) opening shape corresponding to the mounting portion 85. Accordingly, rotation of the ejection piece 83 with respect to the rod member 82 is restricted.

In the vicinity of a tip end portion of the rod member 82, a fixing pin 89 is attached in a state where the fixing pin 89 slightly protrudes toward outside of the mounting portion 85, and a downward movement of the ejection piece 83 is restricted by the fixing pin 89.

The biasing member 84 is formed of, for example, a coil spring or the like, is mounted above the ejection piece 83 of the mounting portion 85, and biases (presses) the ejection piece 83 toward a tip end (lower) side of the ejection rod 81. As described above, in the ejection piece 83, the tip end surface 87a of the abutment portion 87 abuts against the bottom surface 11a of the neck portion 11. At this time, a biasing force of the biasing member 84 is transmitted, via the ejection piece 83, to the container 10. That is, when the ejection piece 83 is inserted into the container 10, the container 10 is biased downward by the biasing force of the biasing member 84.

A method for taking out the container 10 in the take-out part 80 including such an ejection rod 81 will be described with reference to FIG. 8.

Figure 8:
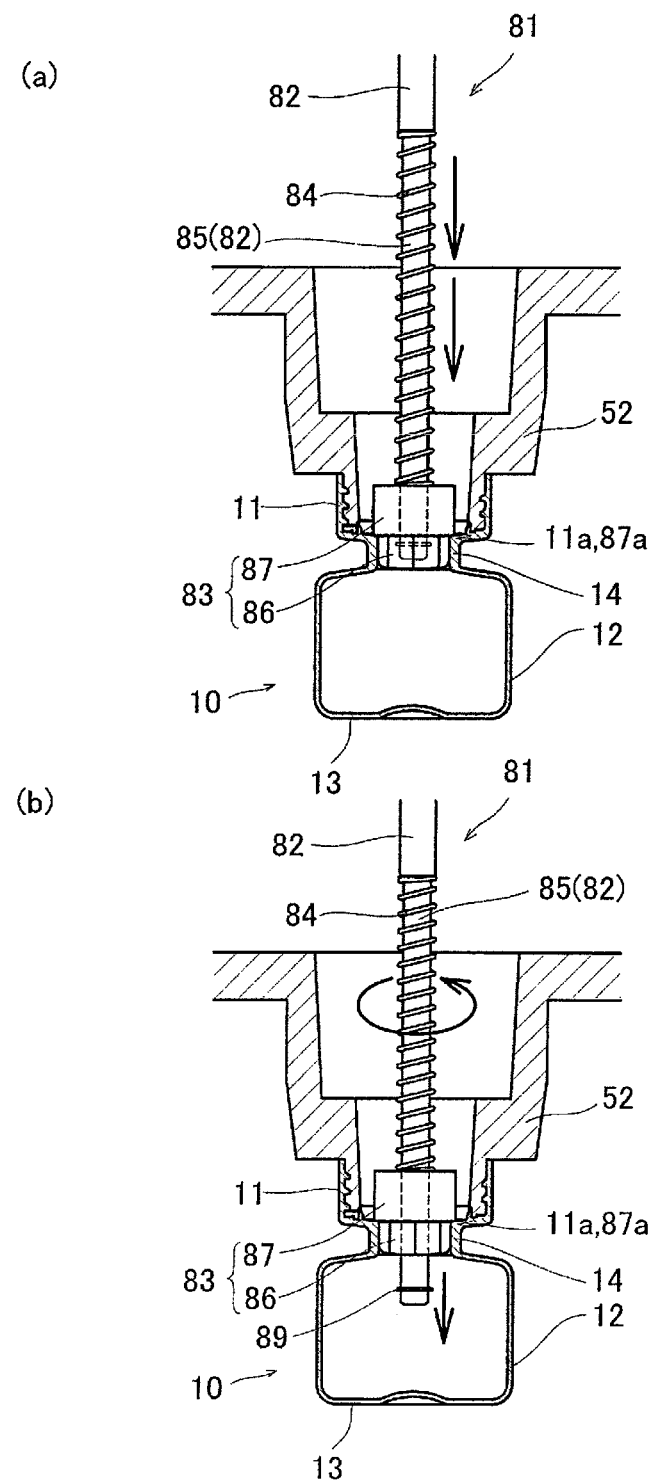
FIG. 8 is a view illustrating a method for taking out the container in a take-out part according to the embodiment of the present invention.

When the container 10 is conveyed from the blow molding part 70 to the take-out part 80 in a state where the neck portion 11 of the container 10 is held by the neck mold 52, the ejection rod 81 is lowered and inserted into the container 10 as shown in (a) of FIG. 8. Specifically, the ejection rod 81 is lowered, so that the engagement portion 86 of the ejection piece 83 is loosely fitted into the small-diameter portion 14 of the container 10 or abuts against (engages with) an inner surface of the small-diameter portion 14.

At this time, at a time point when the tip end surface 87a of the abutment portion 87 abuts against the bottom surface 11a of the neck portion 11, lowering of the ejection piece 83 is stopped, but lowering of the rod member 82 is continued. As shown in (b) of FIG. 8, at a time point when the tip end portion of the rod member 82 reaches a predetermined position, the lowering of the rod member 82 is stopped. That is, the lowering of the rod member 82 is stopped at a position where the biasing force of the biasing member 84 on the ejection piece 83 and the container 10 becomes a desired magnitude.

When the rod member 82 is further lowered in a state where the ejection piece 83 abuts against the bottom surface 11a of the neck portion 11, the ejection piece 83 moves relatively to an upper side of the rod member 82. With such a movement, the biasing member 84 that is the coil spring contracts. As a result, the biasing force on the ejection piece 83 and the container 10 is increased.

Then, in a state where the container 10 is biased by the biasing member 84 in this way, the ejection rod 81 is rotated. At this time, the engagement portion 86 of the ejection piece 83 engages with an inner peripheral surface of the small-diameter portion 14, and the container 10 is also rotated together. That is, the container 10 is rotated along the inner screw portion 16 of the neck portion 11. Accordingly, the container 10 moves downward from the neck mold 52 and is finally demolded from the neck mold 52.

The container 10 is demolded from the neck mold 52 by such a method, whereby the container 10 can be successfully demolded from the neck mold 52 while preventing deformation of the inner screw portion 16. That is, when molding the container 10 which includes the inner screw portion 16 serving as an undercut, the container 10 can be successfully demolded from the neck mold (inner neck mold) 52 while preventing the deformation of the inner screw portion 16.

Particularly, in the present embodiment, since the container 10 is rotated while being biased downward, the container 10 can be more successfully demolded from the neck mold 52. It goes without saying that even when the container 10 is rotated in a state where the container 10 is not biased downward, the container 10 can be demolded from the neck mold 52.

Although not shown in the drawings, the ejection rod 81 is preferably configured, for example, such that an endless belt is extended between a motor and the ejection rod via a plurality of pulleys, and to rotate using the motor as a driving source.

In order to demold the container 10 from the neck mold 52, it is necessary to rotate the ejection rod 81 several times. By using the endless belt, the ejection rod 81 can be relatively easily rotated. Further, when a plurality of containers 10 are molded at a time, a plurality of ejection rods 81 can be simultaneously rotated by the endless belt.

It goes without saying that the method for rotating the ejection rod 81 is not particularly limited. For example, the ejection rod 81 may be rotated by a power transmission mechanism using a rack, a pinion, or the like. However, in order to rotate the ejection rod 81 a plurality of times, there are fears that a size of an apparatus will increase, for example, the rack will become long.

Although one embodiment of the present invention has been described above, it goes without saying that the present invention is not limited to the embodiment described above. The present invention may be appropriately modified without departing from the scope of the invention.

Figure 9:
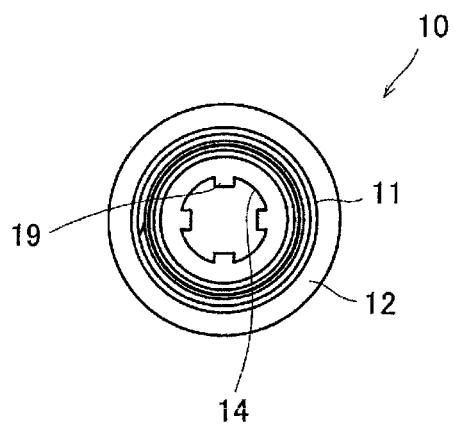
FIG. 9 is a view showing a modification of the container according to the embodiment of the present invention.
Figure 9:
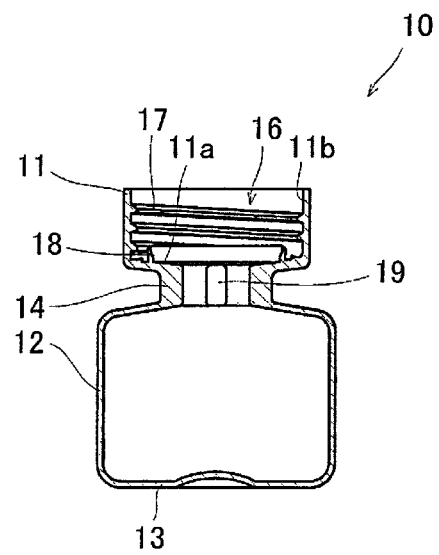

In the embodiment described above, the opening shape of the neck portion 11 of the container 10 is octagonal, but an opening shape of the small-diameter portion 14 is not limited thereto. For example, as shown in FIG. 9, convex portions 19 that protrude inwardly may be provided on an inner peripheral surface of the small-diameter portion 14. That is, the small-diameter portion 14 may have a circular shape including the convex portions 19. In the present embodiment, four convex portions 19 are provided on an inner surface of the small-diameter portion 14 at intervals of 90 degrees. Further, the convex portions 19 are continuously provided along a depth direction of the small-diameter portion 14. Only the opening shape (cross-sectional shape of an inner diameter of the small-diameter portion 14) in the vicinity of an upper end (in the vicinity of the bottom surface 11*a*) of the small-diameter portion 14 may be formed in a polygonal shape. Further, the convex portions 19 may be provided only in the vicinity of the upper end of the small-diameter portion 14 (in the vicinity of the bottom surface 11*a*).

Figure 10:
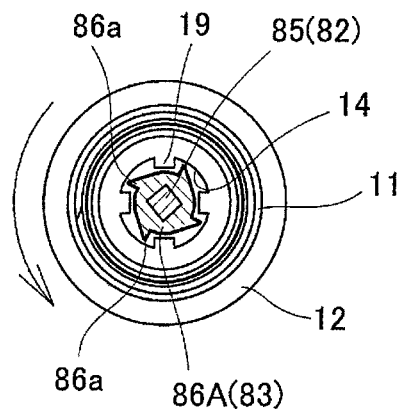
FIG. 10 is a view illustrating a modification of the engagement portion according to the embodiment of the present invention.

On the other hand, as in the embodiment described above, the engagement portion 86 of the ejection piece 83 that loosely fits or engages with such small-diameter portion 14 may have a cross-sectional shape substantially the same as the opening shape of the small-diameter portion 14. Further, for example, as shown in FIG. 10, an engagement portion 86A may engage with the convex portions 19 when the ejection rod 81 is rotated to one side.

Specifically, the engagement portion 86A includes a plurality of claw portions 86*a* that engage with the convex portions 19 on an outer peripheral portion thereof. These claw portions 86*a* are inclined at a predetermined angle with respect to a radial direction of the ejection piece 83. Accordingly, when the ejection rod 81 is rotated to one side, the claw portions 86*a* of the engagement portion 86 engage with the convex portions 19 of the small-diameter portion 14. Therefore, the container 10 is rotated together with the ejection rod 81.

When the ejection rod 81 rotates to the other side, although the claw portions 86*a* of the engagement portion 86 abut against the convex portions 19, the claw portions 86*a* move over without being engaged with the convex portions 19. Therefore, the container 10 is not rotated with the ejection rod 81, and only the ejection rod 81 is rotated.

With such a configuration, the container 10 can be more appropriately rotated by the ejection rod 81 and demolded from the neck mold 52.

For example, in the embodiment described above, when the container 10 is demolded from the neck mold 52, the abutment portion 87 of the ejection piece 83 abuts against the neck portion 11 of the container 10 and biases the container 10 downward. However, a position where the ejection piece 83 abuts is not particularly limited. For example, a protrusion that protrudes inwardly may be provided in the vicinity of a lower end of the small-diameter portion 14, and a tip end surface of the ejection piece 83 (engagement portion 86) may abut against the protrusion.

Figure 11:
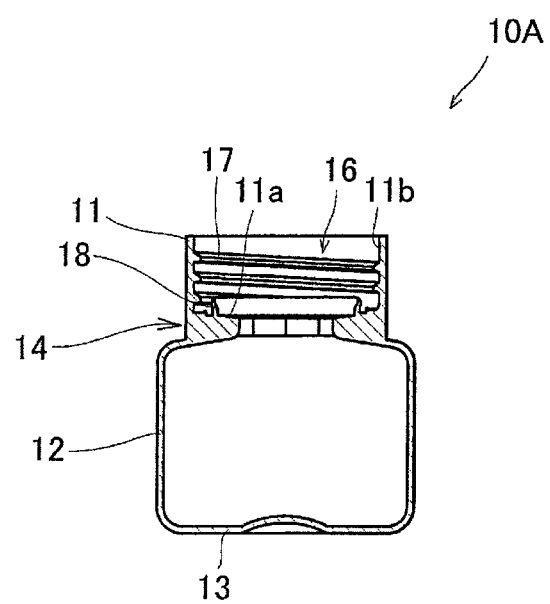
FIG. 11 is a view showing another example of the container that is a hollow article according to an embodiment of the present invention.

In the embodiment described above, although the configuration is exemplified in which the small-diameter portion 14 of the container 10 is formed with an outer diameter smaller than that of the neck portion 11, a size of the outer diameter of the neck portion 11 is not particularly limited. For example, as shown in FIG. 11, the small-diameter portion 14 of a container 10A may have an outer diameter substantially the same as that of the neck portion 11. Although not shown in the drawings, in this case, the connection portion 20*a* of the preform 20 also has an outer diameter substantially the same as that of the neck portion 21.

A length of the small-diameter portion 14 (length in a vertical direction in the drawing) is also not particularly limited as long as the ejection rod 81 can be engaged. For example, the length of the small-diameter portion 14 of the container 10A shown in FIG. 11 is shorter than that of the container 10 shown in FIG. 1.

Figure 12:
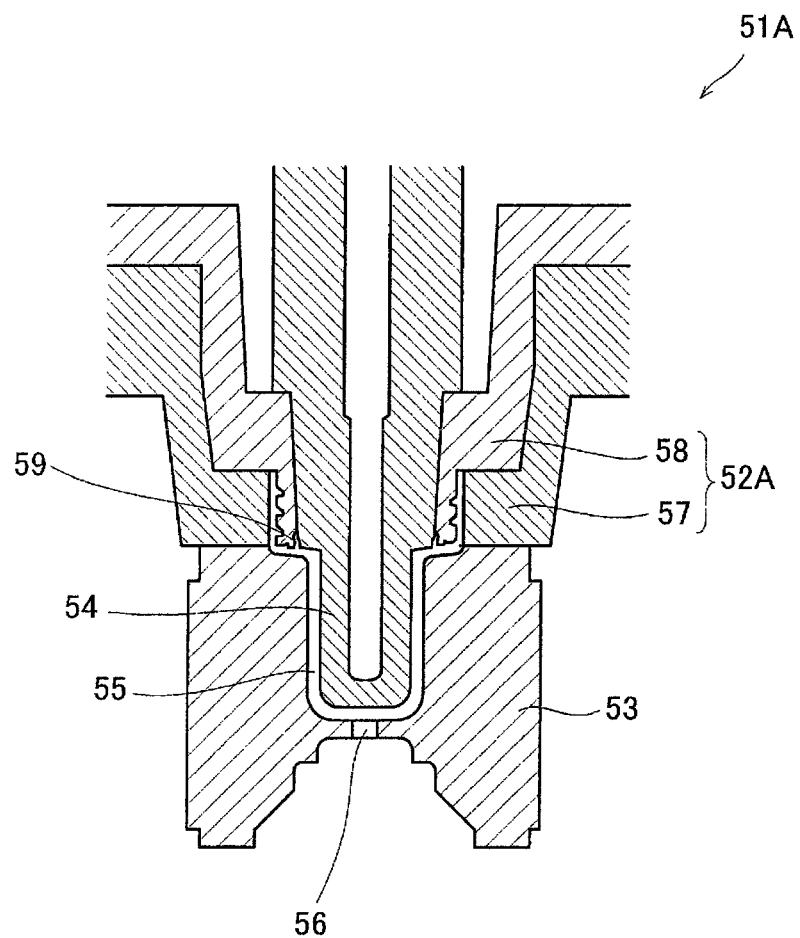
FIG. 12 is a cross-sectional view showing another example of the injection molding mold according to the embodiment of the present invention.

In the embodiment described above, although the configuration is exemplified in which the injection molding mold 51 includes the neck mold 52 that is the inner neck, the configuration of the injection molding mold 51 is not limited thereto. For example, as shown in FIG. 12, an injection molding mold 51A may include a neck mold 52A including an outer neck mold 57 and an inner neck mold 58, and include an injection cavity mold 53A that forms the body portion 22 of the preform 20. That is, instead of the injection cavity mold 53, an outer surface of the neck portion 21 may be formed by the outer neck mold 57 that constitutes the neck mold 52A.

In this case, the preform 20 formed in the injection molding part 50 is conveyed to the temperature adjustment part 60 and the blow molding part 70 in a state where the neck portion 21 is held by the outer neck mold 57 and the inner neck mold 58 that constitute the neck mold 52A. Further, the container 10 blow-molded by the blow molding part 70 is also conveyed to the take-out part 80 in a state where the neck portion 11 is held by the outer neck mold 57 and the inner neck mold 58.

Figure 13:
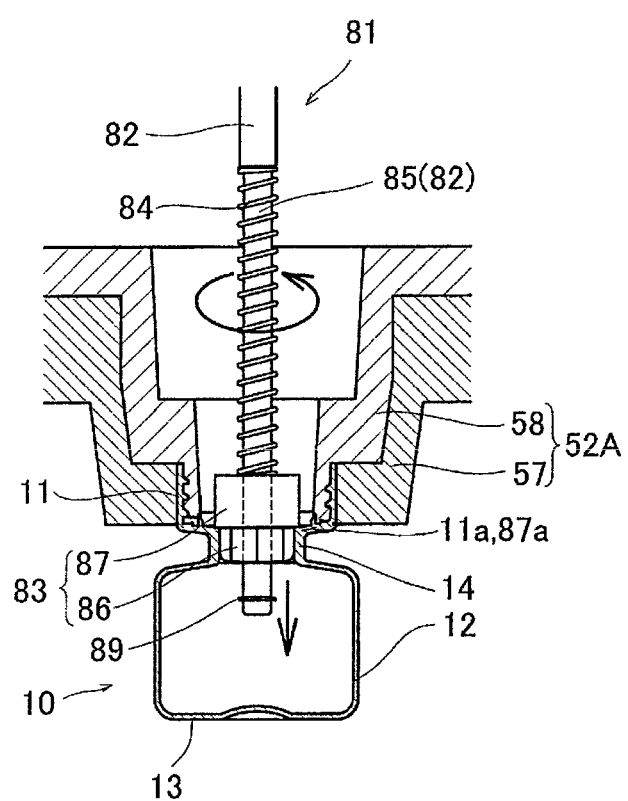
FIG. 13 is a view illustrating a method for taking out the container in the take-out part according to the embodiment of the present invention.

In the take-out part 80, as shown in FIG. 13, the ejection rod 81 is rotated as described above in a state where the neck portion 11 is held by the outer neck mold 57 and the inner neck mold 58. Accordingly, the container 10 moves downward from the inner neck mold 58 and is finally demolded from the inner neck mold 58. Further, with such a rotation operation, the container 10 is simultaneously demolded from the outer neck mold 57.

The outer neck mold 57 may include a plurality of split molds (for example, a pair of split molds) or the like. In this case, the container 10 may be demolded from the outer neck mold 57 at a timing different from a timing when the container 10 is demolded from the inner neck mold 58, for example, before the ejection rod 81 is rotated in the take-out part 80. That is, the outer neck mold 57 including the pair of split molds may be opened before the ejection rod 81 is rotated, and the neck portion 11 of the container 10 may be demolded from the outer neck mold 57 earlier than from the inner neck mold 58.

Further, for example, in the embodiment described above, although the configuration in which one container is molded is exemplified as the injection blow molding apparatus, it goes without saying that the injection blow molding apparatus may be configured to mold a plurality of containers at a time. Further, in the embodiment described above, although the configuration in which the injection blow molding apparatus includes the temperature adjustment part is exemplified, the injection blow molding apparatus may include the temperature adjustment part as necessary, and may not necessarily include the temperature adjustment part.

In the embodiment described above, although the container is demolded from the neck mold in the take-out part, it goes without saying that the container may be demolded from the neck mold in the blow molding part. That is, the blow molding part may also serve as the take-out part.

In the embodiment described above, although the container is exemplified as an example of the hollow article, the present invention can be applied to various hollow articles and molding thereof. For example, the hollow article may be a preform for blow molding a container that is a final product. That is, the present invention can also be applied to demolding the preform from an injection molding mold.

REFERENCE SIGNS LIST

10 Container
11 Neck portion
12 Body portion
13 Bottom portion
14 Small-diameter portion
16 Inner screw portion
18 Protruding portion
19 Convex portion
20 Preform
21 Neck portion
22 Body portion
23 Bottom portion
24 Protruding portion
25 Inner screw portion
30 Injection blow molding apparatus
50 Injection molding part
51 Injection molding mold
52 Neck mold
53 Injection cavity mold
54 Injection core mold
55 Injection space
56 Gate
57 Outer neck mold
58 Inner neck mold
59 Space portion
60 Temperature adjustment part
70 Blow molding part
71 Blow molding mold
72 Blow cavity mold
73 Bottom mold
74 Blow core mold
75 Blow cavity
76 Concave portion
77 Supply hole
80 Take-out part
81 Ejection rod
82 Rod member
83 Ejection piece
84 Biasing member
85 Mounting portion
86 Engagement portion
87 Abutment portion
88 Through hole
89 Fixing pin
100 Injection device

The invention claimed is:

1. A method for molding a hollow article, the hollow article including a neck portion opened on one end side thereof and a body portion connected to the neck portion, and an inner screw portion being formed on an inner surface of the neck portion, the method comprising:
   molding the hollow article in a state where the inner surface of the neck portion including the inner screw portion is held by an inner neck mold, and then;
   demolding the hollow article from the inner neck mold by inserting an ejection rod into the hollow article to be engaged with an inner surface of the hollow article and rotating the hollow article together with the ejection rod.

2. The method for molding the hollow article according to claim 1,
   wherein the hollow article includes a small-diameter portion having an inner diameter smaller than that of the neck portion and connected to the neck portion and the body portion,
   wherein an opening-shape of the small-diameter portion is formed in a non-circular shape, and
   wherein the ejection rod is engaged with the hollow article by inserting the ejection rod having a cross-sectional shape substantially the same as the opening shape of the small-diameter portion into the small-diameter portion.

3. The method for molding the hollow article according to claim 2,
   wherein the opening shape of the small-diameter portion is formed in a polygonal shape or a circular shape having a convex portion that protrudes inwardly.

4. The method for molding the hollow article according to claim 1,
   wherein, when the hollow article is rotated by the ejection rod, a tip end surface of the ejection rod is caused to abut against the hollow article to press the hollow article.

5. An apparatus for molding a hollow article, the hollow article including a neck portion opened on one end side thereof and a body portion connected to the neck portion, and an inner screw portion being formed on an inner surface of the neck portion, the apparatus comprising:
- a molding part configured to mold the hollow article in a state where the inner surface of the neck portion including the inner screw portion is held by an inner neck mold; and
- a take-out part configured to demold the hollow article from the inner neck mold,
- wherein the take-out part includes an ejection rod including an engagement portion rotatably inserted into the hollow article and engaged with an inner surface of the hollow article during rotation.

6. The apparatus for molding the hollow article according to claim 5,
- wherein the engagement portion is configured to engage with the inner surface of the hollow article when the ejection rod is rotated to one side.

7. The apparatus for molding the hollow article according to claim 5,
- wherein the ejection rod includes an ejection piece whose tip end surface abuts against the hollow article and which is movable in an axial direction of the ejection rod, and a biasing member which biases the ejection piece to a tip end side of the ejection rod.

8. The apparatus for molding the hollow article according to claim 7,
- wherein the ejection piece includes the engagement portion.

9. A hollow article comprising:
- a neck portion opened on one end side thereof and to which an inner screw portion is formed on an inner surface thereof;
- a body portion connected to the neck portion; and
- a small-diameter portion having an inner diameter smaller than that of the neck portion entirely in a circumferential direction of the hollow article in a top view, the small-diameter portion being connected to the neck portion and the body portion,
- wherein an opening shape of the small-diameter portion is a non-circular shape.

10. The hollow article according to claim 9,
- wherein an opening shape of the small-diameter portion is a polygonal shape or a circular shape having a convex portion that protrudes inwardly.

* * * * *